United States Patent

Bills, Sr.

[11] Patent Number: 5,540,473
[45] Date of Patent: Jul. 30, 1996

[54] TRUCK BED LINER WITH REINFORCED CORNERS

[75] Inventor: Dennis B. Bills, Sr., Lapeer, Mich.

[73] Assignee: The Colonel's, Inc., Milan, Mich.

[21] Appl. No.: 496,606

[22] Filed: Jun. 29, 1995

[51] Int. Cl.⁶ .................................................. B60R 13/01
[52] U.S. Cl. ............................................................ 296/39.2
[58] Field of Search .............................. 296/39.1, 39.2; 224/42.42; 220/410, 403

[56] References Cited

U.S. PATENT DOCUMENTS

| Re. 32,198 | 7/1986 | Wayne | 296/39 R |
|---|---|---|---|
| D. 333,112 | 2/1993 | Diaco et al. | D12/98 |
| 4,047,749 | 9/1977 | Lambitz et al. | 296/39 R |
| 4,111,481 | 9/1978 | Nix et al. | 296/39 R |
| 4,181,349 | 1/1980 | Nix et al. | 296/39 R |
| 4,575,146 | 3/1986 | Markos | 296/39 R |
| 4,767,149 | 8/1988 | Rye | 296/39 R |
| 4,958,876 | 9/1990 | Diaco et al. | 296/39.2 |
| 4,974,895 | 12/1990 | Davenport | 296/39.2 |
| 5,100,193 | 3/1992 | Oprea et al. | 296/39.2 |
| 5,221,119 | 6/1993 | Emery | 296/39.2 |

Primary Examiner—Joseph D. Pape
Attorney, Agent, or Firm—Gifford, Krass, Groh, Sprinkle, Patmore, Anderson & Citkowski, P. C.

[57] ABSTRACT

A truck bed liner is provided with an arrangement of angled wall portions and fillets to provide strength. A center front wall portion is angled forwardly between a pair of vertically aligned end panels having angled fillets to provide strength and rigidity. The angled center portion permits stacking of 4'×8' sheet material. A channel is formed in the floor to permit drainage of water from forward corners of the liner.

10 Claims, 2 Drawing Sheets

TRUCK BED LINER WITH REINFORCED CORNERS

BACKGROUND OF THE INVENTION

I. Field of the Invention

The present invention relates to bed liners of the kind commonly used for the beds of pickup trucks and, more particularly, to a bed liner having a center wall portion angled to provide rigidity to the bed liner.

II. Description of the Prior Art

In order to prevent the bed portion of the pickup truck from being marred or otherwise damaged by cargo, bed liners have been used to protect the walls and floor of the truck bed from damage. Truck bed liners are typically formed as a partial box having a front wall and a pair of side walls extending from a floor. The truck bed liners are typically molded in one piece of a synthetic material.

In order to minimize expense and weight of the truck bed liner, various techniques have been devised in order to provide sufficient rigidity and strength in the truck bed liner while minimizing the amount of material used to form the liner or detracting from the useable space. It is known, as shown in U.S. Pat. No. 4,047,749, to provide the side and front walls with vertically extending ribs to provide rigidity and compensate for the tendency of polyethylene to become wavy when exposed to sunlight.

It is also known to form longitudinal ribs in the floors of the liners, such as disclosed in U.S. Pat. No. 4,181,349 to Nix et al, to strengthen the floor. However, previous rib alignments have not provided for proper drainage of all of the interior of the truck bed liner.

As shown in Reissue Patent No. 32,198, it is known to provide the front and side walls of a truck bed liner with horizontally extending stepped panels in order to provide rigidity. The cargo impact areas are further strengthened by forming a step down portion extending to a corner bend portion. The bend portion is shielded from contact with cargo by longitudinal ribs which extend toward the bend portion. However, the ribs end before the bend portion so that this cargo does not come in contact with the bend portion.

Thus, it is desirable to provide a truck bed liner which is easily molded from a minimum amount of material, but having substantial strength and rigidity.

Additionally, it is desirable to provide a cargo carrying area sufficiently large to carry 4'×8' sheet material, such as sheets of drywall and plywood, in horizontal alignment on the floor of the liner. Finally, it is desirable to form a liner which provides proper drainage from all areas of the liner.

SUMMARY OF THE INVENTION

In light of the foregoing objects, the present invention provides a protective liner for a track bed of the type having a pair of side walls and a front wall, each of which has a top rail. The truck bed liner is formed in one piece of a molded synthetic material and includes a pair of side walls and a front wall extend upwardly from a floor. The truck bed liner is formed as an "under the rail" liner with a top portion of each side wall of the liner positioned within the area beneath the top rails. The front wall has a center portion extending on an angle between a pair of vertically extending end portions. The center portion extends forwardly towards the truck cab as it descends to the floor to extend the length of the floor. The center portion has a width equal to a width between the wheel well covers so that the truck bed liner can accommodate wide sheet-like materials such as 4'×8' sheets of plywood or drywall. A fillet extends between each end portion and the floor. The fillet and angled center portion provide strength and rigidity to the truck bed liner. The side walls also include a portion which is angled with respect to a vertical wall portion. The floor is provided with a series of longitudinally extending ribs. The ribs define channels to deliver water from the area adjacent each corner formed between the front wall and side walls. The ribs and channels curve around the wheel well to extend to the rear of the truck bed liner.

BRIEF DESCRIPTION OF THE DRAWINGS

The features of the present invention will be apparent from the following detailed description when considered in conjunction with the accompanying drawings, wherein:

FIG. 3 is an enlarged view of a fillet of the circle 4 as shown in FIG. 2.

DETAILED DESCRIPTION OF THE PREFERRED EMBODIMENT

Figure 1:
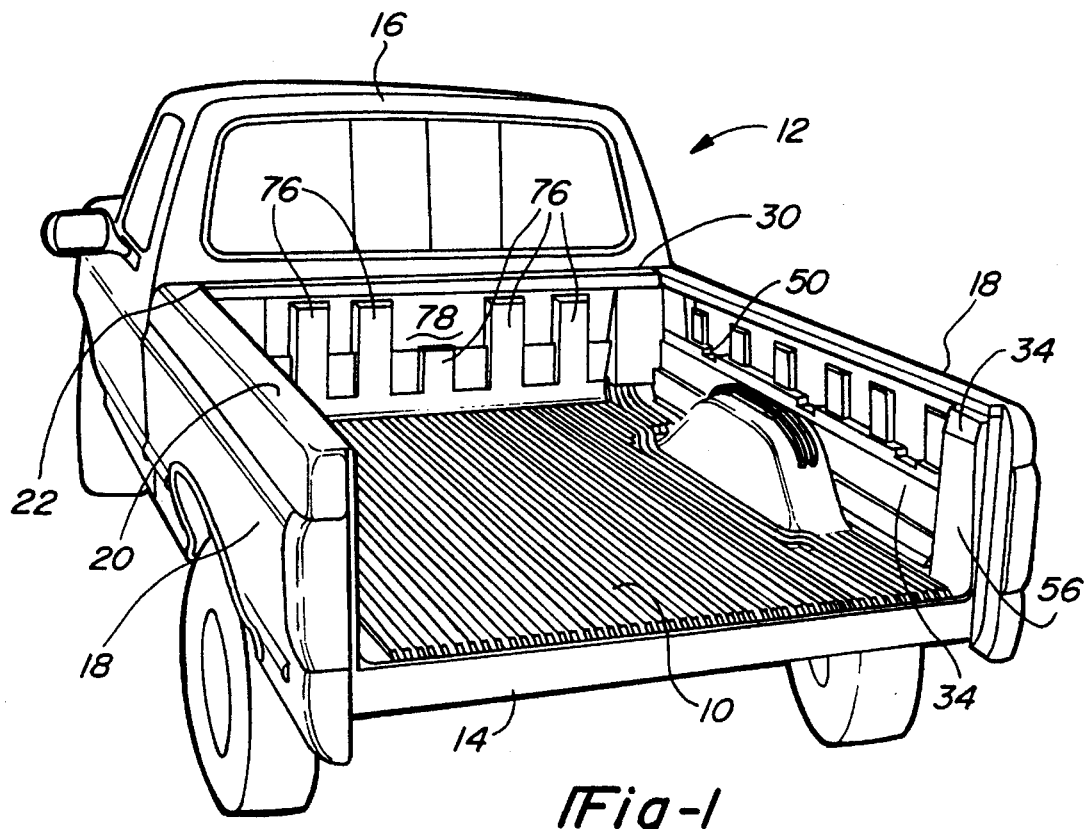
FIG. 1 is a perspective view of a truck bed liner in accordance with the invention, shown in position for use in a truck bed of a pickup truck.

With reference to the drawings, where like reference numerals represent like elements throughout the several views, in FIG. 1 a preferred embodiment of a truck bed liner 10 is shown in position on a pickup truck 12. The truck 12 has a truck bed 14 extending rearwardly from a cab 16. The truck bed 14 includes a pair of side walls 18 having top rails 20 which extend first inwardly and then downwardly in an inverted U-shape. A front wall (not shown) having a top rail 22 extends behind the cab 16. The truck bed also has a wheel well (not shown) extending from each side wall 18. Three pockets (not shown) are formed in each side wall to accept slats which may be positioned to extend transversely across the truck bed 14 to support a shelf in the event that the user wishes to have a two tiered cargo arrangement. Because the liner 10 is symmetrical about a longitudinal axis, only the right side, as shown in FIG. 2, will be described in detail.

Figure 2:
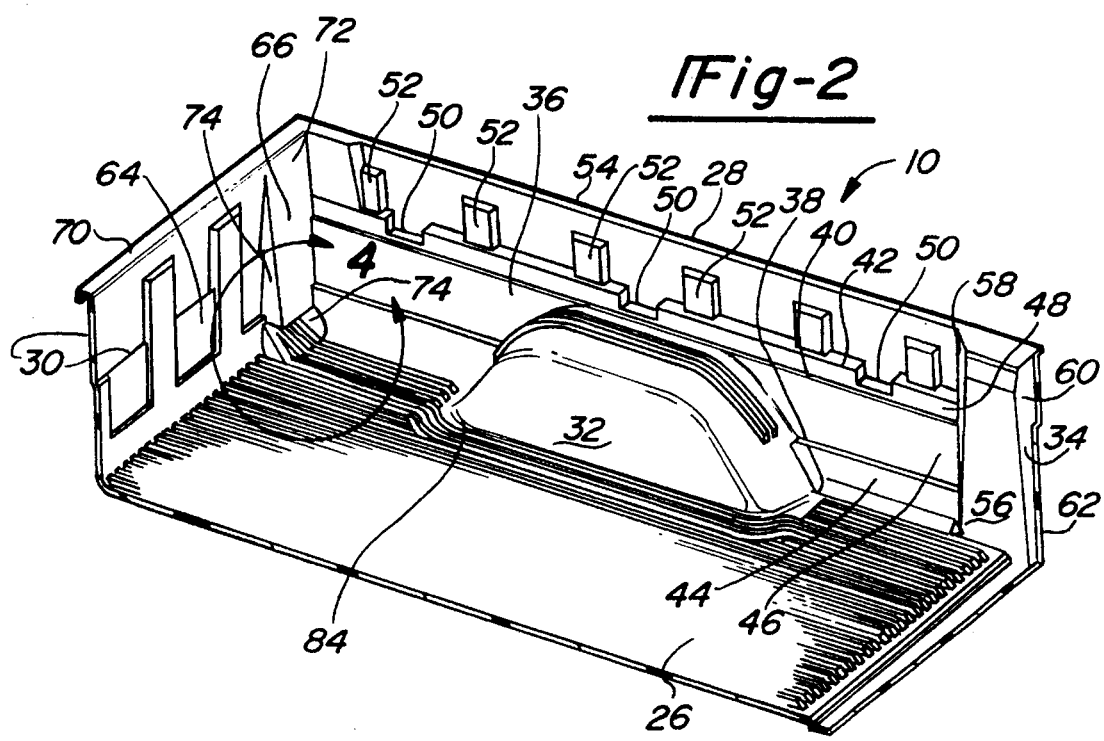
FIG. 2 is a partial perspective view of the liner shown in accordance with the invention.

As shown in FIG. 2, the liner 10 has a floor 26, a pair of side walls 28 and a front wall 30 defining a cargo carrying area. A wheel well cover portion 32 extends from the side wall 28 to cover the wheel well of the truck bed 14. The truck bed liner 10 is molded in one piece formed of a suitable synthetic material, such as high density polyethylene, and the walls have a uniform thickness of approximately 0.0050 to 0.0090 inch, depending on the thickness of the initial material.

As shown in FIGS. 1 and 2, the side wall 28 has a stepped wall portion 36 extending between the front wall 30 and an end panel 34 defining an open end of the liner. The stepped wall 36 has a series of alternating horizontal shelves 38, 40, 42 which extend between three riser portions 44, 46, 48 to provide a progression of steps extending outwardly and upwardly from the floor 26. Three notches 50 are formed in the top shelf 42 and riser 48 to conform with pockets formed in the side wall 28 of the truck bed to accept slats for supporting a shelf, as discussed above. A plurality of vertically aligned trapezoidal ribs 52 extend upwardly from the top shelf 42 and end a distance beneath a top edge 54 of an upper portion of the side wall 28. The end panel 34 has a vertical face 56 extending between a pair of angled side portions 58, 60 from the floor. The inner side portion 58 extends between the stepped wall 34 and vertical face 56 and the outer side portion extends to a rear edge 62 of the liner 10.

As best shown in FIG. 2, the front wall 30 has an angled center portion 64 extending between a pair of end portions 66. An inverted U-shaped flange 70 is formed along the top of the front wall 30 to extend over the top rail 22 of the front wall of the truck bed (as shown in FIG. 1). Each end portion 66 has a vertical face portion 72 and a side portion 74 which extends from the vertical face 72 to the center portion 64.

Figure 4:
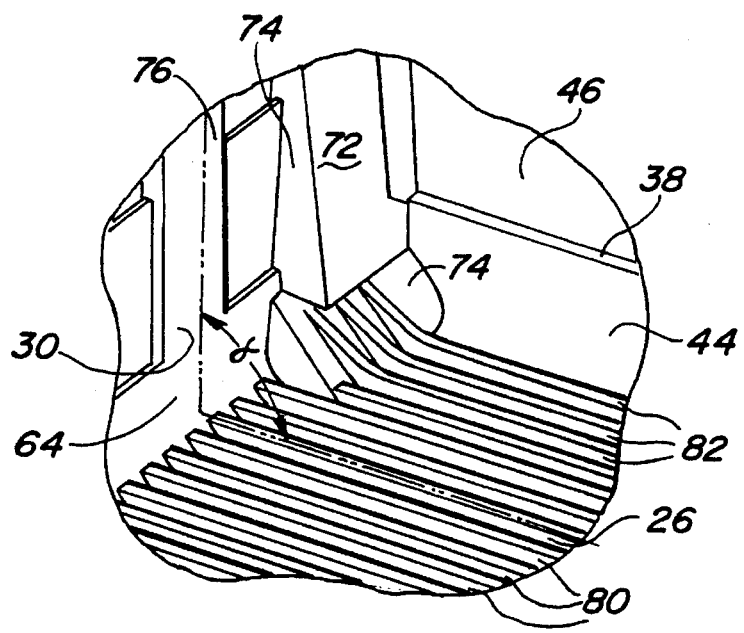

As best shown in FIG. 4, a fillet 74 is angled between the floor 26 and the vertical face portion 72 and a portion of the center wall. The fillet 74 has a width from the side wall 28 to the center portion which is equal to or less than the width between the wheel well covers 34 to accommodate standard size flat sheet materials such as 4'×8' sheets of plywood or drywall. The end portion 66 and fillet 74 provide strength to the liner in critical corner areas and permit a thin wall construction of the walls. The fillet 74 is not solid throughout. Rather an air gap exists between the fillet 74 and the front wall 30.

As shown in FIGS. 1 and 4, the center wall portion 64 angles forwardly towards the cab 16 under the rail 22 as it extends toward the floor 26. The center portion intersects the floor at an angle $\alpha$ of less than 90°, thus providing additional longitudinal length to the truck bed liner 10 from the front wall 30 to the rear edge 62 of the liner. The center portion 64 is provided with five vertically extending trapezoidal ribs 76 which are provided to provide rigidity to the liner and minimize warpage of the liner. A rectangular area 78 is provided in the center to permit placement of the manufacturer's identification or trademark.

Figure 3:
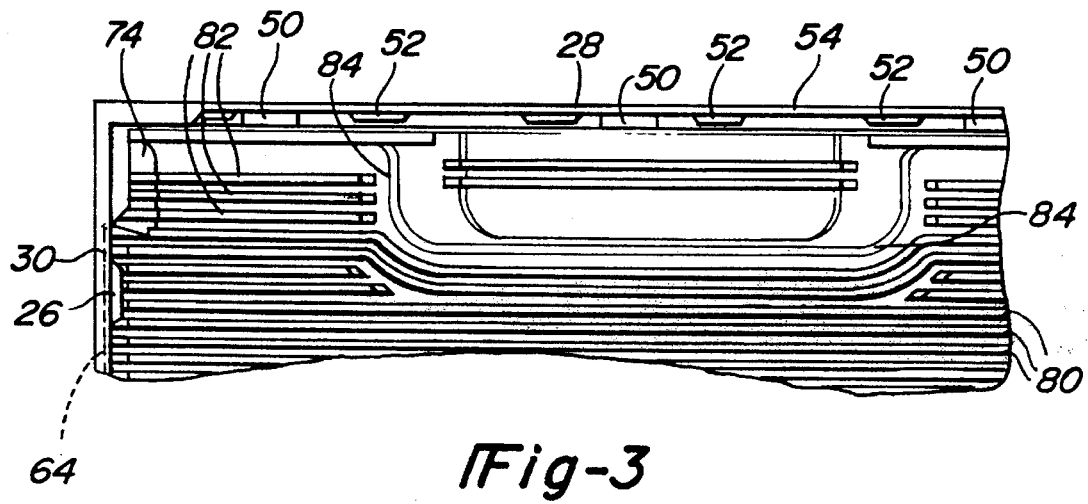
FIG. 3 is a partial top view showing a portion of a right hand side of the bed liner in accordance with the invention.

As best shown in FIG. 3, the floor 26 is provided with a plurality of longitudinally extending ribs 80. Each rib 80 extends from the front wall 30 to the rear edge 62. Additional ribs 82 are provided to extend from the fillet 74 to a short distance before the wheel well cover 32 to a channel 84 which extends around the wheel well cover. In this way, water from the corners is delivered to the channel 84 and carried around the wheel well cover and out the rear of the truck bed liner.

The truck bed liner of the invention is formed as an "under the rail liner". The side walls 28 extend upwardly from the floor to be received freely within an inverted U-shaped area under the rail 20 of the side walls 18 of the truck bed 14. As discussed above, the truck bed liner according to the present invention provides a stiff, rigid, but thin walled liner utilizing a minimum of material while providing maximum rigidity and strength. The arrangement of walls and fillets permits ample space to accommodate 4'×8' sheets of material in a horizontal alignment. The side walls are readily accepted within the rails of the side walls, but because of the rigidity provided by the gussets and fillet remain rigid without attachment to the track bed to facilitate easy installation and removal of the truck bed liner.

The present invention may be embodied in other specific forms without departing from the spirit or essential attributes thereof, and accordingly, reference should be made to the appended claims, rather than to the foregoing specification, as indicating the scope of the invention.

I claim:

1. A truck bed liner for a truck, said liner comprising:
    a body having a floor, a pair of side walls and a front wall, said front wall having a center portion and a pair of end portions, said center portion extending at an angle with respect to said pair of end portions, said center portion having a predetermined width intersecting said floor at an angle of less than 90°.

2. The truck bed liner of claim 1, wherein said end portions have a generally vertically extending face portion.

3. The truck bed liner of claim 1, wherein said liner further comprises a pair of wheel well covers disposed a predetermined distance apart, said predetermined distance being generally equal to said predetermined width of said center portion.

4. The truck bed liner of claim 1, wherein said body further comprises a fillet extending between each end portion and said floor.

5. The truck bed liner of claim 1, wherein each of said wheel well covers extend inwardly a predetermined width from said side wall, each of said fillets having a predetermined length extending between one of said pair of side walls and said center portion, said predetermined length being equal or less than said width of said wheel well cover.

6. The truck bed liner of claim 1, wherein each said side wall comprises an end portion having a vertical face and a stepped portion angled with respect to said vertical face portion.

7. A truck bed liner for a truck, said liner comprising:
    a body having a floor, a pair of side walls and a front wall, said front wall having a center portion and a pair of end portions, said center portion extending at an angle with respect to said pair of end portions, said center portion having a predetermined width intersecting said floor at an angle of less than 90°, a pair of wheel well covers disposed a predetermined distance apart, said predetermined distance being generally equal to said predetermined width of said center portion.

8. The truck bed liner of claim 7, wherein said end portions have a generally vertically extending face portion.

9. The truck bed liner of claim 7, wherein said body further comprises a fillet extending between each end portion and said floor.

10. The truck bed liner of claim 7, wherein each of said wheel well covers extend inwardly a predetermined width from said side wall, each of said fillets having a predetermined length between one of said pair of side walls and said center portion, said predetermined length being equal or less than said width of said wheel well cover.

\* \* \* \* \*

UNITED STATES PATENT AND TRADEMARK OFFICE
CERTIFICATE OF CORRECTION

PATENT NO. : 5,540,473
DATED : July 30, 1996
INVENTOR(S) : Dennis B. Bills, Sr.

It is certified that error appears in the above-indentified patent and that said Letters Patent is hereby corrected as shown below:

Column 1, line 56, delete "track" and insert --truck--.

Column 2, line 9, delete "comer" and insert --corner--;

Column 2, line 27, delete "FIG.3" and insert --FIG. 4--.

Signed and Sealed this

Twelfth Day of November, 1996

*Attest:*

BRUCE LEHMAN

*Attesting Officer*     *Commissioner of Patents and Trademarks*